ANTRAM & MULLIN.

Fodder Stand.

No. 111,301.   Patented Jan. 31, 1871.

Witnesses:   Inventor,

United States Patent Office.

JOHN ANTRAM AND ELWOOD B. MULLIN, OF FRANKLIN, OHIO.

Letters Patent No. 111,301, dated January 31, 1871.

IMPROVEMENT IN FODDER-STANDS.

The Schedule referred to in these Letters Patent and making part of the same.

*To all whom it may concern:*

Be it known that we, JOHN ANTRAM and ELWOOD B. MULLIN, of Franklin, in the county of Warren, in the State of Ohio, have invented a new and useful Improvement in Fodder-Stands; and we do hereby declare that the following is a full and exact description thereof, reference being had to the accompanying drawing and to the letters of reference marked thereon.

The object of our invention is to provide a simple and efficient support around which corn-fodder may be shocked with facility, and which may be easily removed from the shock without injuriously affecting it after it is completed.

The tapering bench A is supported upon the legs B, C, and D.

The leg D is pivoted at the smaller end of bench A, so that it will turn freely upon its pivot $a$, and the legs B C are properly braced by rods $b\ c\ d$.

Upon the broader end of bench A a short spindle is secured, upon which a spool of twine may be placed for binding the shock of fodder when completed.

Figure 1:
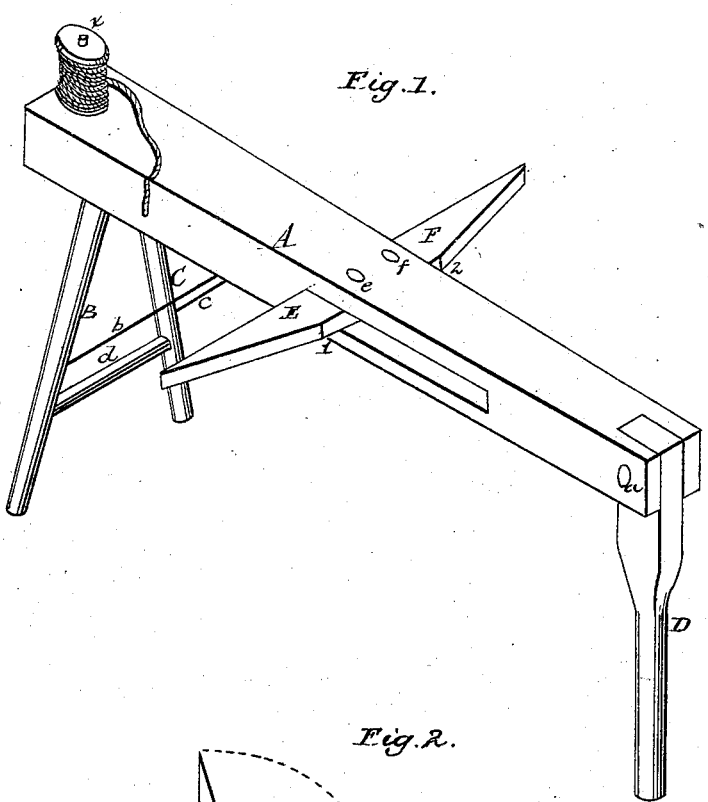
Figure 1 represents a perspective view of our fodder-stand as adjusted for use.
Figure 2:
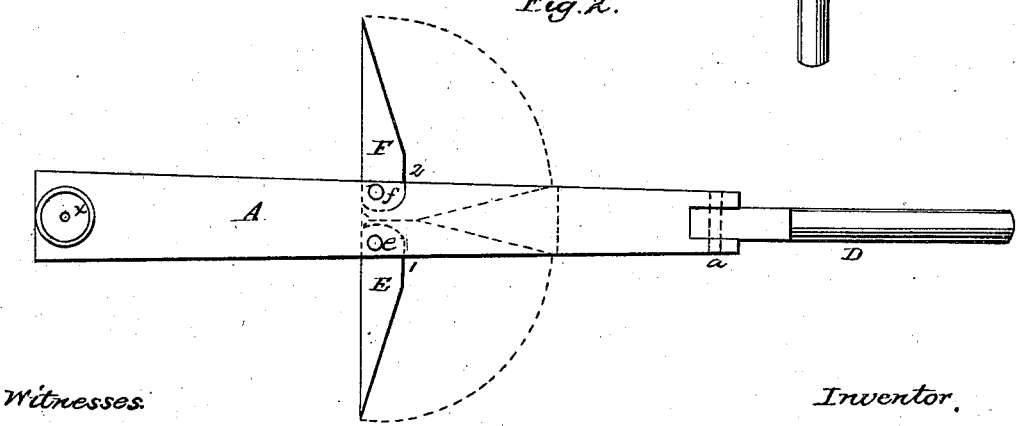
Figure 2 represents a top view of the same, with the arms and hinged leg extended horizontally.

At the center of the bench two arms, E F, are pivoted in suitable slots or mortises in the sides of bench A, as indicated by dotted lines in fig. 2, and these arms may be easily adjusted to the horizontal position, as represented in the drawing.

The arms E F freely move upon their pivots or hinge-bolts $e\ f$, and when closed occupy positions within their respective slots.

In using our stand the workman will place it in the position, upon its three legs B C D, where the shock of fodder is to be built, and after adjusting the arms E F in a position at right angles to the bench A, as represented, the fodder, by handfuls, as it is cut, is placed in an upright position against the bench A, the first two armfuls being set up in the angles 1 2, formed by arms E F and bench A, which will retain the arms in their extended position while the shock is being built around the fodder-stand by setting up the fodder in the usual manner.

When a sufficient quantity of fodder or corn has been thus accumulated to form a shock, the workman will bind it by the use of the twine upon the spool X. The shock being completed, the workman will grasp the legs B C and withdraw the fodder-stand from within the shock, and in so doing the arms E F and leg D will not obstruct the operation, as they will freely turn upon their hinges and assume a longitudinal position with the bench A as they meet any obstruction while the stand is being withdrawn from the shock.

To a proper understanding of the advantages of the use of such an implement, it should be here stated that the general practice in shocking corn has been to tie together the stalks of four hills of corn in each place in the field where a shock of corn or fodder is desired to be built. Such a support is insufficient for the purpose of forming a firm shock around it, and consequently the shocks so formed often fall down, and much corn and fodder are damaged, beside much time is taken up in tying the stalks for the purpose.

Having fully described our new fodder-stand,

What we claim, and desire to secure by Letters Patent, is—

The bench A, provided with legs B C D and folding arms E F, arranged to operate in combination substantially as herein specified, and for the purpose described.

In testimony whereof we have hereunto set our hands this 31st day of October, A. D. 1870.

JOHN ANTRAM.
ELWOOD B. MULLIN.

Witnesses:
R. S. LOCKWOOD,
ISAAC DEARTH.